United States Patent
Yamamoto

(10) Patent No.: US 9,645,382 B2
(45) Date of Patent: May 9, 2017

(54) OBJECTIVE LENS FOR ENDOSCOPE AND ENDOSCOPE

(71) Applicant: FUJIFILM CORPORATION, Tokyo (JP)

(72) Inventor: Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/323,169

(22) Filed: Jul. 3, 2014

(65) Prior Publication Data
US 2015/0022907 A1    Jan. 22, 2015

(30) Foreign Application Priority Data
Jul. 19, 2013   (JP) ................................ 2013-150499

(51) Int. Cl.
    G02B 23/24    (2006.01)
(52) U.S. Cl.
    CPC ....... G02B 23/243 (2013.01); G02B 23/2438 (2013.01)
(58) Field of Classification Search
    CPC  G02B 23/243; G02B 23/2438; G02B 13/009; G02B 15/167; G02B 15/177; A61B 1/00188; A61B 1/0019
    USPC ....... 359/656, 660, 676, 684, 686, 749, 753; 600/101–183
    See application file for complete search history.

(56) References Cited

U.S. PATENT DOCUMENTS

| 7,511,892 B2 | 3/2009 | Takato |
| 2007/0258150 A1* | 11/2007 | Takato ............... G02B 13/0045 359/686 |
| 2013/0163094 A1* | 6/2013 | Takada ............... G02B 23/2438 359/684 |

FOREIGN PATENT DOCUMENTS

| JP | 2876252 | 1/1999 |
| JP | 2001-166203 | 6/2001 |
| JP | 2004-21158 | 1/2004 |
| JP | 2007-260305 | 10/2007 |

OTHER PUBLICATIONS

Japanese Official Action—2013-150499—Aug. 16, 2016.

* cited by examiner

*Primary Examiner* — Darryl J Collins
*Assistant Examiner* — Gary O'Neill
(74) *Attorney, Agent, or Firm* — Young & Thompson

(57) ABSTRACT

An objective lens for an endoscope focuses from a farthest point object to a nearest point object by moving, along optical axis Z, at least one lens group excluding a most object-side lens group. The objective lens satisfies the formulae:

$1.2 \leq ft/fw$, and $0.0 < (fm-fw)/(ft-fw) \leq 0.5$, where ft is a focal length of an entire system when the objective lens has been focused on the nearest point object, fw is a focal length of the entire system when the objective lens has been focused on the farthest point object, and fm is a focal length of the entire system when the objective lens has been focused on the middle point object.

13 Claims, 11 Drawing Sheets

FIG.1
EXAMPLE 1
FARTHEST POINT OBSERVATION STATE
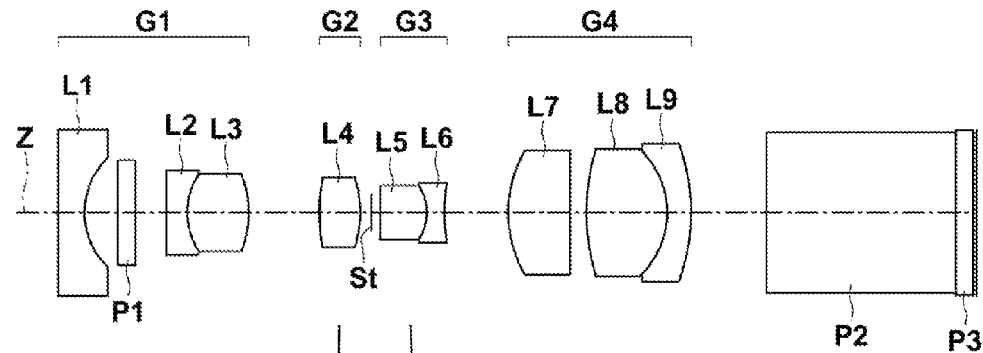
MIDDLE POINT OBSERVATION STATE
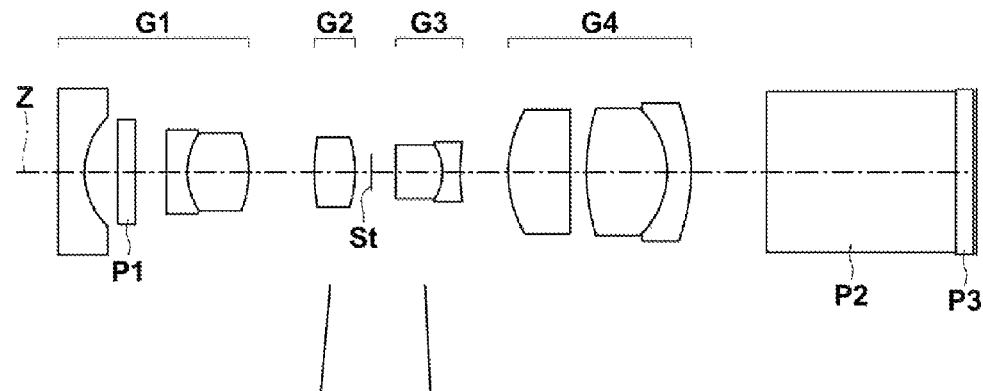
NEAREST POINT OBSERVATION STATE
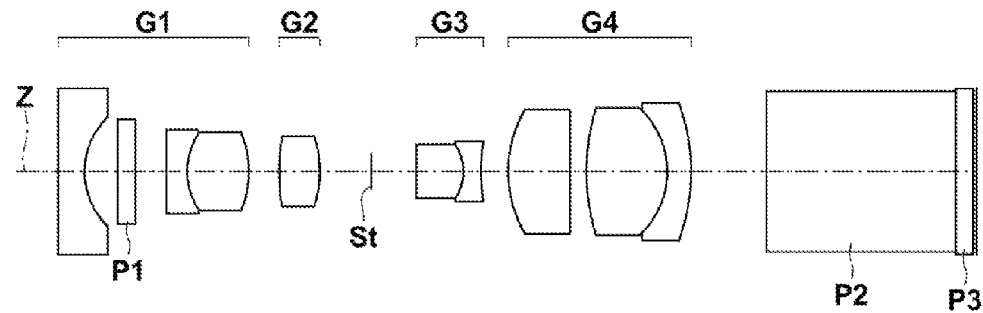

FIG.2
EXAMPLE 2-1
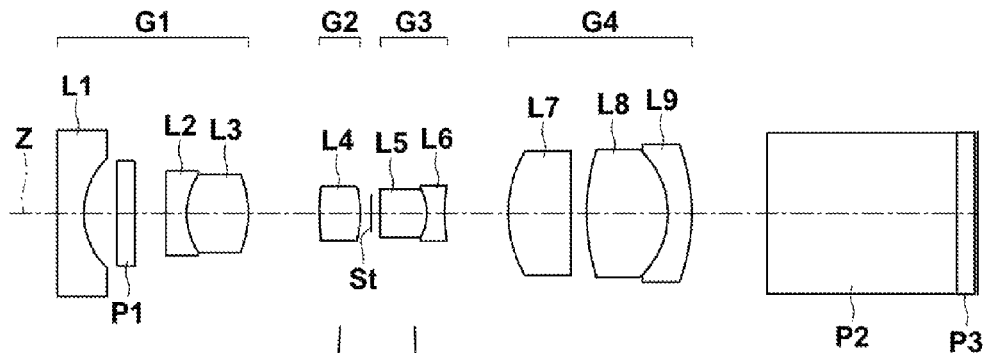
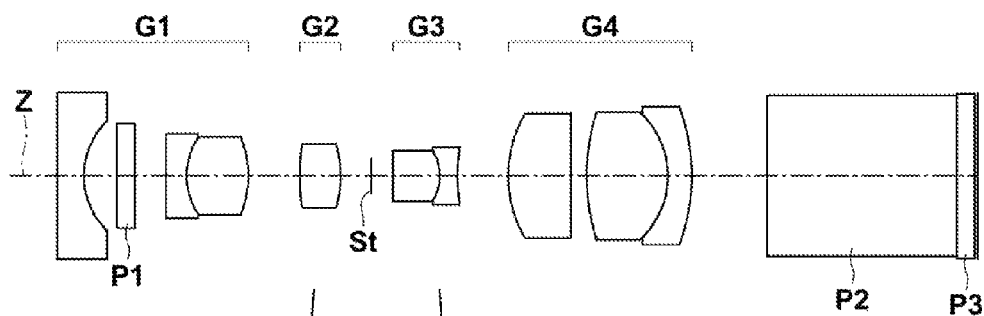
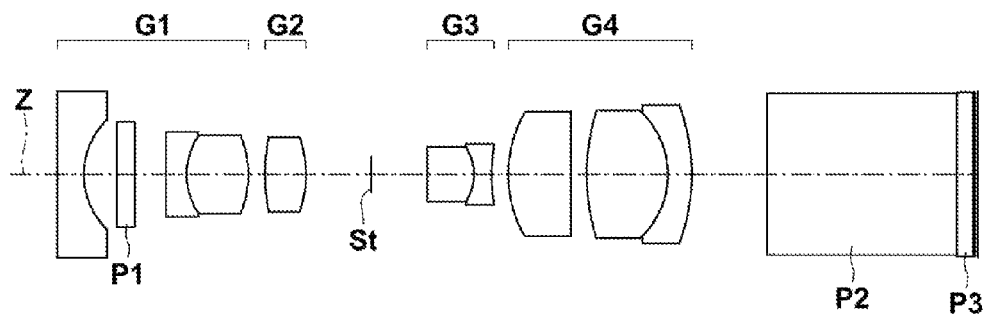

FIG.3
EXAMPLE 3-1
FARTHEST POINT OBSERVATION STATE
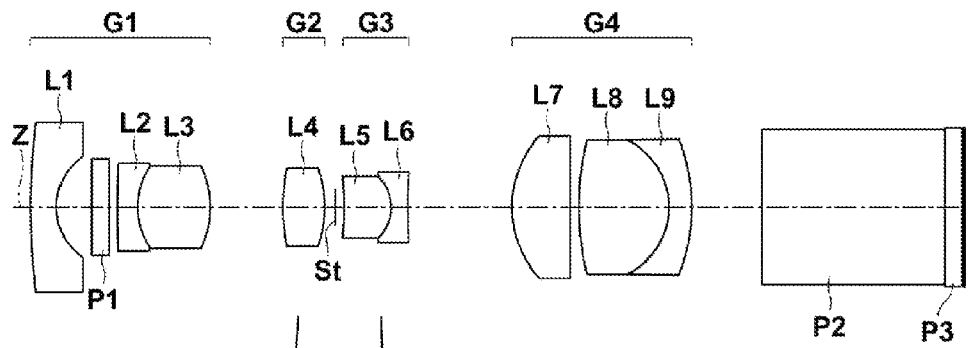
MIDDLE POINT OBSERVATION STATE
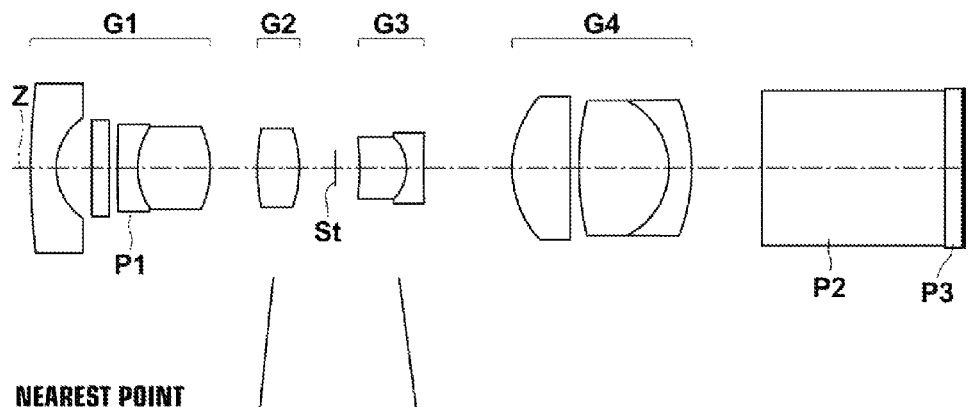
NEAREST POINT OBSERVATION STATE
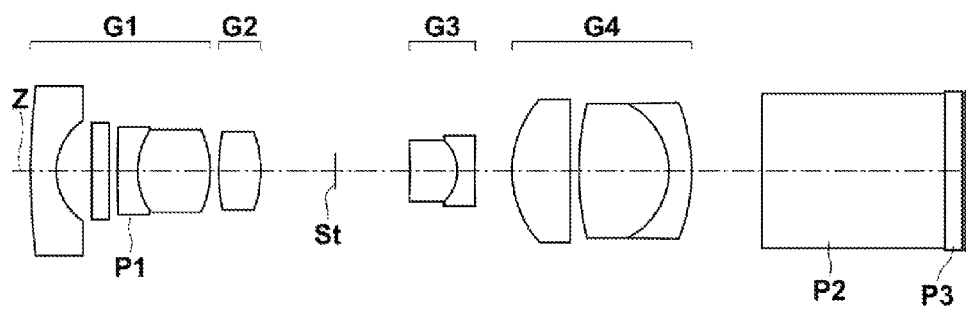

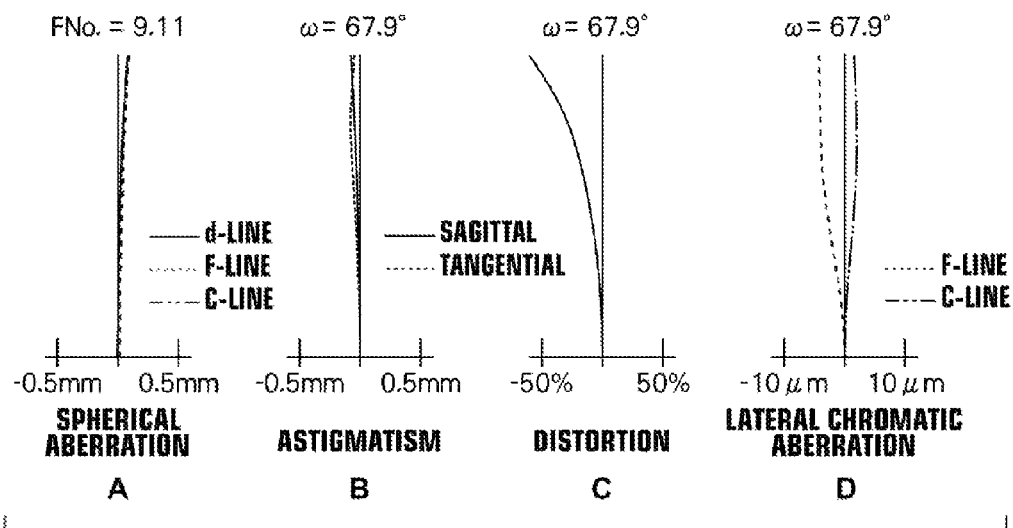
FIG.4 EXAMPLE 1
FARTHEST POINT OBSERVATION STATE
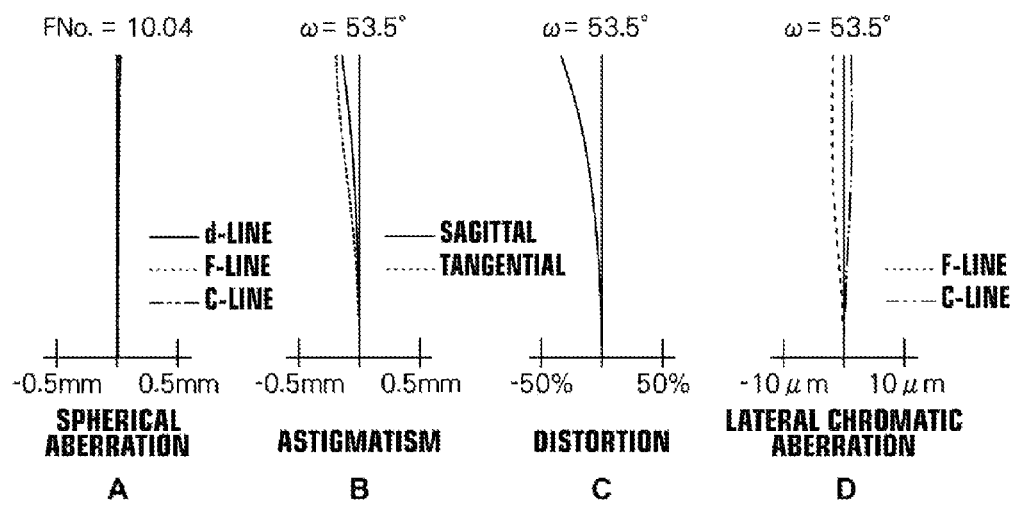
FIG.5 EXAMPLE 1
MIDDLE POINT OBSERVATION STATE

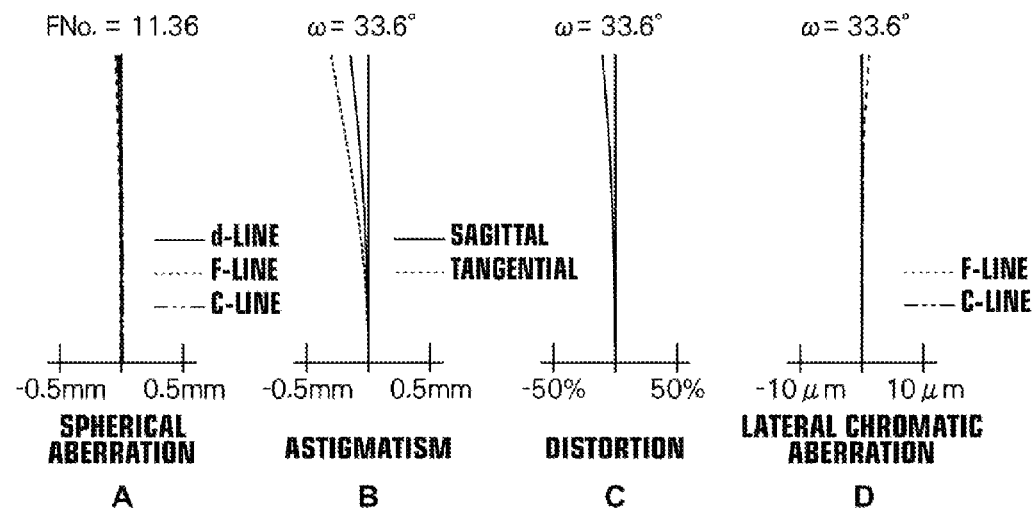
FIG.6 EXAMPLE 1
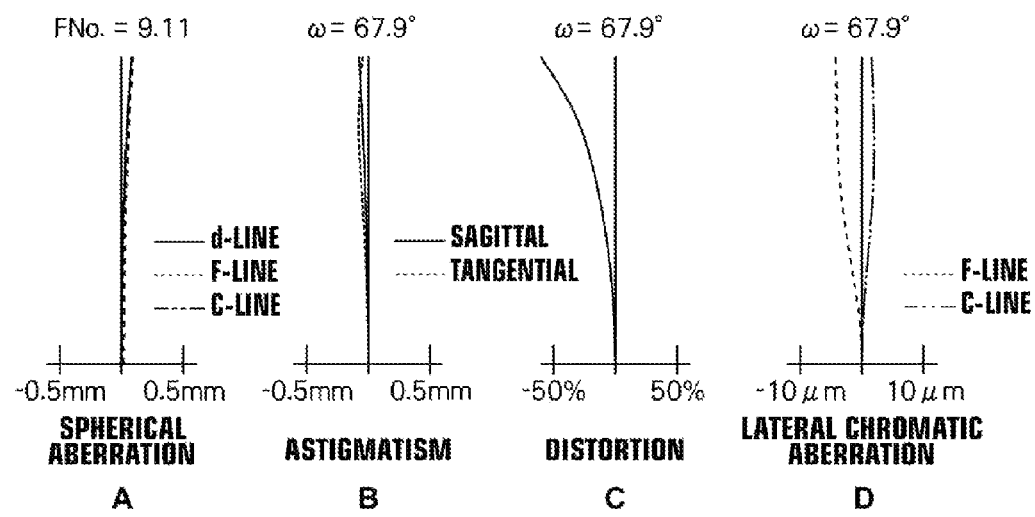
FIG.7 EXAMPLE 2-1, EXAMPLE 2-2

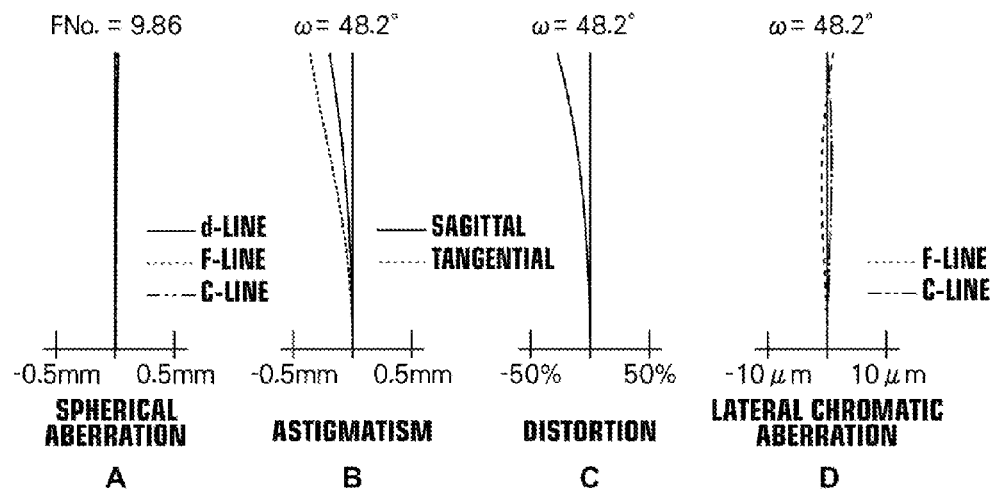
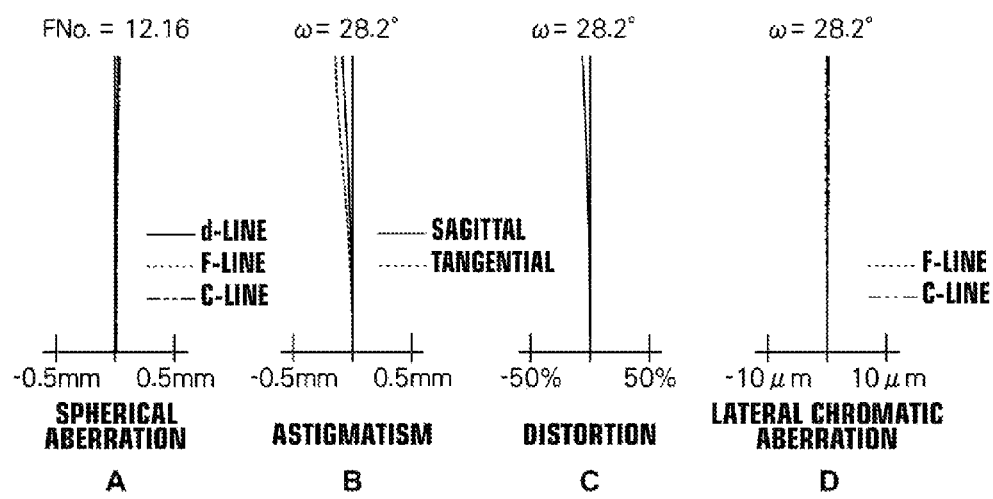

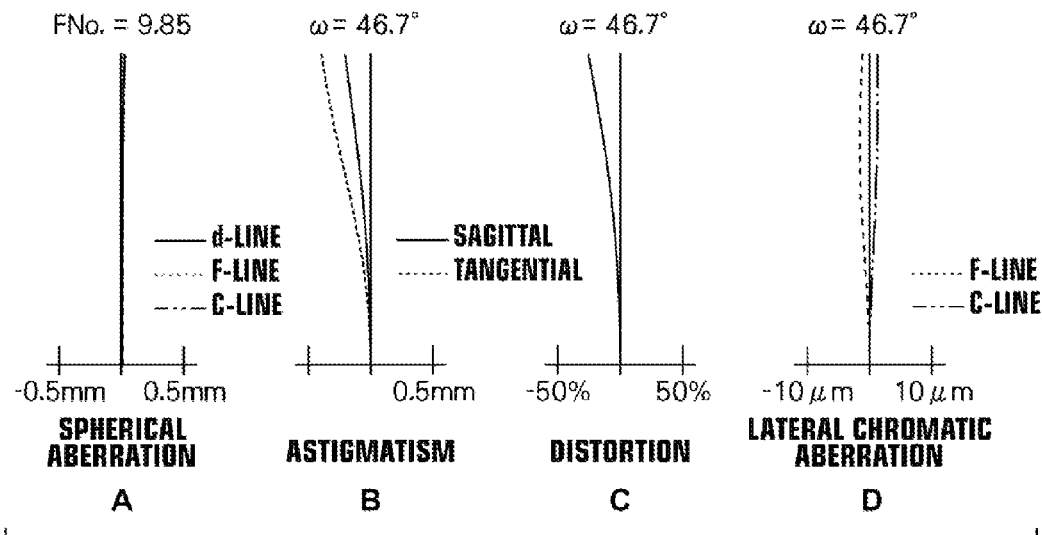
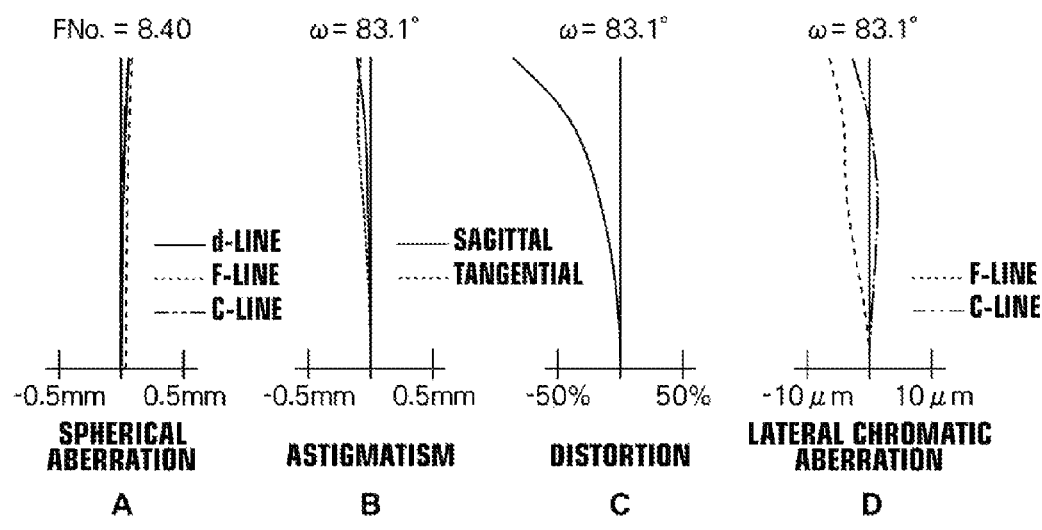

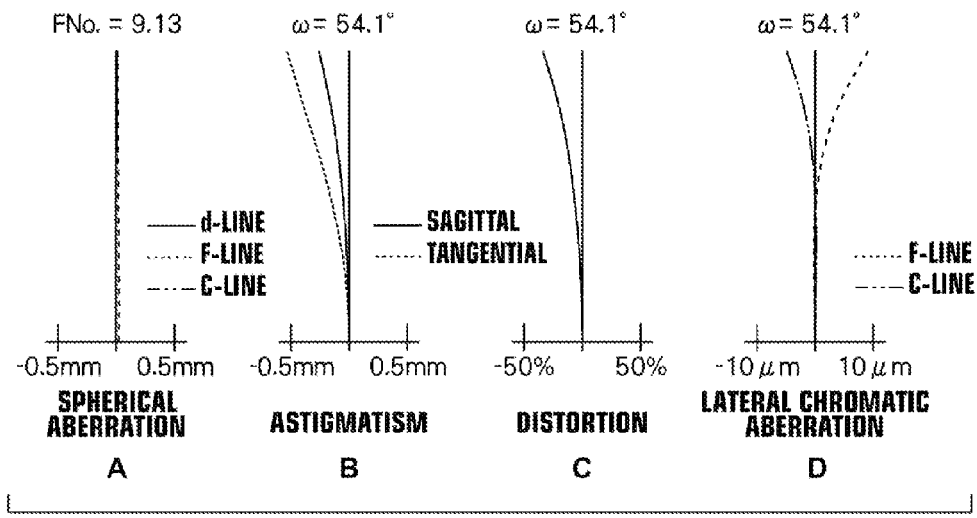
FIG.12 EXAMPLE 3-1
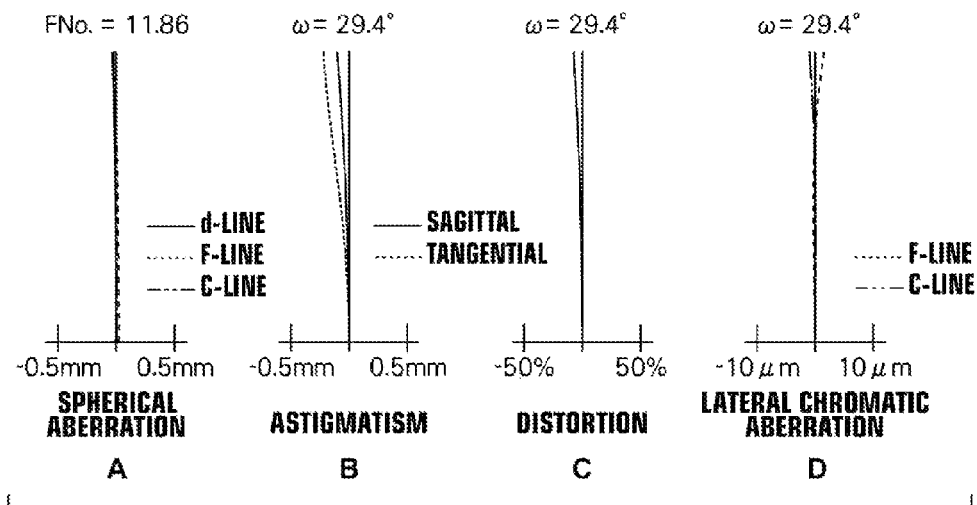
FIG.13 EXAMPLE 3-1, EXAMPLE 3-2

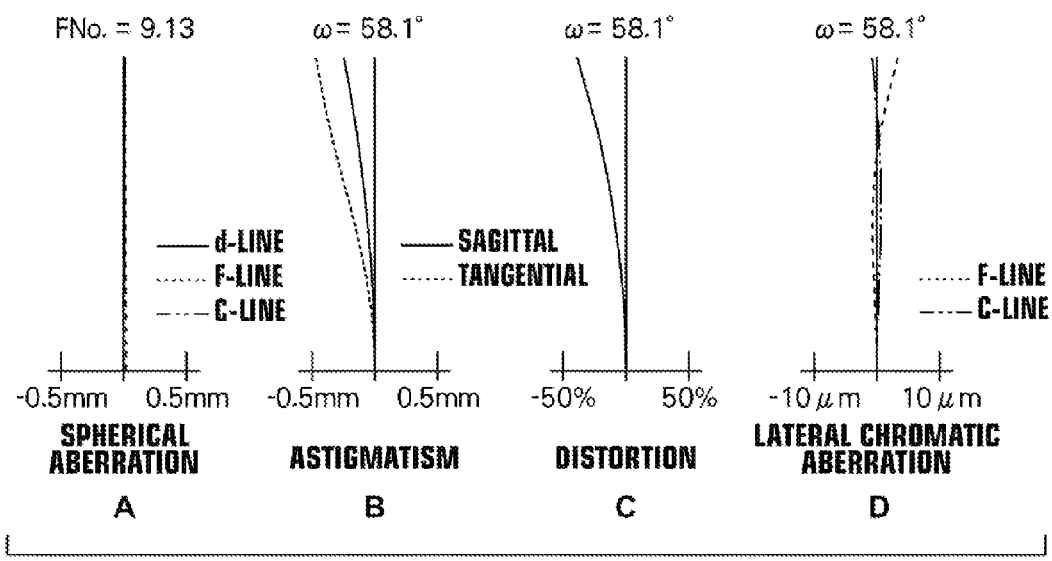

OBJECTIVE LENS FOR ENDOSCOPE AND ENDOSCOPE

CROSS-REFERENCE TO RELATED APPLICATIONS

The present application claims priority under 35 U.S.C. §119 to Japanese Patent Application No. 2013-150499, filed on Jul. 19, 2013. The above application is hereby expressly incorporated by reference, in its entirety, into the present application.

BACKGROUND OF THE INVENTION

Field of the Invention

The present invention relates to an objective lens for an endoscope and an endoscope. In particular, the present invention relates to an objective lens for an endoscope in which focusing is performed from a farthest point object to a nearest point object by moving a part of lens groups in a system, and also to an endoscope including this objective lens for an endoscope.

Description of the Related Art

In observation by endoscopes, users want to observe a wide range, as a whole, and also a part, such as a diseased region that has been found in observation of the whole area, in detail. Conventionally, such demand was often satisfied by using a fixed focus lens with a deep depth of field. However, further improvement in image qualities is requested, because the trend of endoscopes is a higher pixel number and a wider angle of view, and also because images imaged by endoscopes are read in and analysis and observation are performed on the images.

In view of such situations, objective lenses for endoscopes in which the usage state of an endoscope is switchable between a far-point-side observation state (wide), which is appropriate for observation of a region as a whole, and a near-point-side magnified observation state (tele), which is appropriate for observation of a part of the region, became used. As an example of such related art, an objective lens disclosed in Japanese Patent No. 2876252 (Patent Document 1) is known.

The objective lens for an endoscope disclosed in Patent Document 1 consists of four lens groups, and negative refractive power, positive refractive power, negative refractive power and positive refractive power are arranged in this order from an object side. Further, the usage state is switched, as described above, by moving a third lens group of the four lens groups.

SUMMARY OF THE INVENTION

When a diseased region that has been found in observation of the whole area is observed as a part in detail, as described above, the diseased region is not always observed while the diseased region is located at a nearest point. In actual observation, observation is often performed while an objective lens and the diseased region are placed close to each other to such an extent that a significant magnified observation effect is obtainable. Therefore, there is a demand for an objective lens for an endoscope that enables excellent observation while a target of observation is located in a region between a farthest point and a nearest point to such an extent that a significant magnified observation effect is obtainable.

However, in the objective lens for an endoscope disclosed in Patent Document 1, when a point located between a farthest point and a nearest point is set as a middle point, an amount of variation in a focal length with respect to a change in an object distance at this middle point is large. In an objective lens for an endoscope the focal length of the entire system of which is variable based on an object distance, the focal length of the entire system in a near-point-side magnified observation state is longer than the focal length of the entire system in the far-point-side observation state. Therefore, an observation depth (the depth of field) in the near-point-side magnified observation state is shallow, and adjustment of focus becomes even more difficult. When the amount of variation in the focal length at the middle point is large, as in the objective lens for an endoscope disclosed in Patent Document 1, an observation depth becomes shallower in the region from the middle point to the nearest point, and adjustment of focus becomes extremely difficult. Further, when the amount of variation in the focal length is large, a magnification in observation greatly changes, and the size of an observation image greatly changes. Therefore, there are problems that observation is extremely difficult, and that a target of observation tends to disappear from a field of view.

In view of the foregoing circumstances, it is an object of the present invention to provide an objective lens for an endoscope, the focus of which is easily adjustable during magnified observation, and in which excellent observation is possible, and to provide an endoscope including the objective lens for an endoscope.

An objective lens for an endoscope of the present invention is configured to perform focusing from a farthest point object to a nearest point object by moving, along an optical axis, at least one lens group excluding a most object-side lens group. Further, the following conditional formulas (1) and (2) are satisfied:

$$1.2 \leq ft/fw \quad (1); \text{ and}$$

$$0.0 < (fm-fw)/(ft-fw) \leq 0.5 \quad (2), \text{ where}$$

ft: a focal length of an entire system when the objective lens has been focused on the nearest point object, fw: a focal length of the entire system when the objective lens has been focused on the farthest point object, dt: an object distance to the nearest point object, dw: an object distance to the farthest point object, dm, which is represented by $dm=(2 \times dw \times dt)/(dw+dt)$: an object distance to a middle point object, and fm: a focal length of the entire system when the objective lens has been focused on the middle point object.

It is desirable that the objective lens for an endoscope of the present invention further satisfies the following conditional formula (2') in the range satisfying the aforementioned conditional formula (2):

$$0.0 < (fm-fw)/(ft-fw) \leq 0.4 \quad (2').$$

In the objective lens for an endoscope of the present invention, it is desirable that one of the lens groups that move during focusing is a negative lens group. Further, in the objective lens for an endoscope of the present invention, it is desirable that focusing is performed by moving two lens groups in such a manner that a distance between the two lens groups changes. In that case, it is desirable that the two lens groups that move during focusing are a positive lens group and a negative lens group.

It is desirable that the objective lens for an endoscope of the present invention satisfies the following conditional formula (3). It is more desirable that the following conditional formula (3') is satisfied:

$$0.0 < (fmw - fw)/(ft - fw) \leq 0.25 \quad (3); \text{ and}$$

$$0.0 < (fmw - fw)/(ft - fw) \leq 0.20 \quad (3'), \text{ where}$$

dmw, which is represented by dmw=(4×dw×dt)/(dw+3×dt): an object distance to a medium far point object, and fmw: a focal length of the entire system when the objective lens has been focused on the medium far point object.

It is desirable that the objective lens for an endoscope of the present invention substantially consists of a first lens group having negative refractive power, a second lens group having positive refractive power, a third lens group having negative refractive power and a fourth lens group having positive refractive power in this order from an object side. Here, the expression "substantially consists of" means substantially consisting of these lens groups. Therefore, lenses substantially without any refractive power, optical elements, such as apertures and cover glass, lens flanges, lens barrels and the like may be included besides the lens groups mentioned as composition elements.

In the objective lens for an endoscope of the present invention, it is desirable that a movement path of the at least one lens group that moves during focusing is variable.

Here, the term "lens group" does not necessarily mean a lens group composed of plural lenses. The lens group may be composed of only a lens.

Further, the term "farthest point" means a point that is in best focus and farthest from the objective lens for an endoscope in the range of length on the target-of-observation side. The term "nearest point" means a point that is in best focus and nearest to the objective lens for an endoscope in the range of length on the target-of-observation side. Further, the term "object distance" means a distance, on an optical axis, from a most object-side lens surface of the objective lens for an endoscope to an object.

The sign of refractive power will be considered in a paraxial region when an aspheric lens is included, unless otherwise mentioned.

An endoscope of the present invention includes the objective lens for an endoscope of the present invention, as described above.

The present invention can provide an objective lens for an endoscope that can shift from a far-point-side observation state to a near-point-side magnified observation state, and in which focusing is easily performable during magnified observation and excellent image is observable, and an endoscope including this objective lens for an endoscope.

BRIEF DESCRIPTION OF THE DRAWINGS

FIG. 1 is a cross section illustrating the structure of an objective lens for an endoscope in Example 1 of the present invention;

FIG. 2 is a cross section illustrating the structure of an objective lens for an endoscope in Example 2-1 of the present invention;

FIG. 3 is a cross section illustrating the structure of an objective lens for an endoscope in Example 3-1 of the present invention;

FIG. 4 is aberration diagrams of the objective lens for an endoscope in Example 1 of the present invention in a farthest point observation state, and Section A illustrates a spherical aberration, Section B illustrates astigmatism, Section C illustrates distortion, and Section D illustrates a lateral chromatic aberration;

FIG. 5 is aberration diagrams of the objective lens for an endoscope in Example 1 of the present invention in a middle point observation state, and Section A illustrates a spherical aberration, Section B illustrates astigmatism, Section C illustrates distortion, and Section D illustrates a lateral chromatic aberration;

FIG. 6 is aberration diagrams of the objective lens for an endoscope in Example 1 of the present invention in a nearest point observation state, and Section A illustrates a spherical aberration, Section B illustrates astigmatism, Section C illustrates distortion, and Section D illustrates a lateral chromatic aberration;

FIG. 7 is aberration diagrams of the objective lens for an endoscope in Examples 2-1, 2-2 of the present invention in a farthest point observation state, and Section A illustrates a spherical aberration, Section B illustrates astigmatism, Section C illustrates distortion, and Section D illustrates a lateral chromatic aberration;

FIG. 8 is aberration diagrams of the objective lens for an endoscope in Example 2-1 of the present invention in a middle point observation state, and Section A illustrates a spherical aberration, Section B illustrates astigmatism, Section C illustrates distortion, and Section D illustrates a lateral chromatic aberration;

FIG. 9 is aberration diagrams of the objective lens for an endoscope in Examples 2-1, 2-2 of the present invention in a nearest point observation state, and Section A illustrates a spherical aberration, Section B illustrates astigmatism, Section C illustrates distortion, and Section D illustrates a lateral chromatic aberration;

FIG. 10 is aberration diagrams of the objective lens for an endoscope in Example 2-2 of the present invention in a middle point observation state, and Section A illustrates a spherical aberration, Section B illustrates astigmatism, Section C illustrates distortion, and Section D illustrates a lateral chromatic aberration;

FIG. 11 is aberration diagrams of the objective lens for an endoscope in Examples 3-1, 3-2 of the present invention in a farthest point observation state, and Section A illustrates a spherical aberration, Section B illustrates astigmatism, Section C illustrates distortion, and Section D illustrates a lateral chromatic aberration;

FIG. 12 is aberration diagrams of the objective lens for an endoscope in Example 3-1 of the present invention in a middle point observation state, and Section A illustrates a spherical aberration, Section B illustrates astigmatism, Section C illustrates distortion, and Section D illustrates a lateral chromatic aberration;

FIG. 13 is aberration diagrams of the objective lens for an endoscope in Examples 3-1, 3-2 of the present invention in a nearest point observation state, and Section A illustrates a spherical aberration, Section B illustrates astigmatism, Section C illustrates distortion, and Section D illustrates a lateral chromatic aberration;

FIG. 14 is aberration diagrams of the objective lens for an endoscope in Example 3-2 of the present invention in a middle point observation state, and Section A illustrates a spherical aberration, Section B illustrates astigmatism, Section C illustrates distortion, and Section D illustrates a lateral chromatic aberration;

DESCRIPTION OF THE PREFERRED EMBODIMENTS

Figure 15:
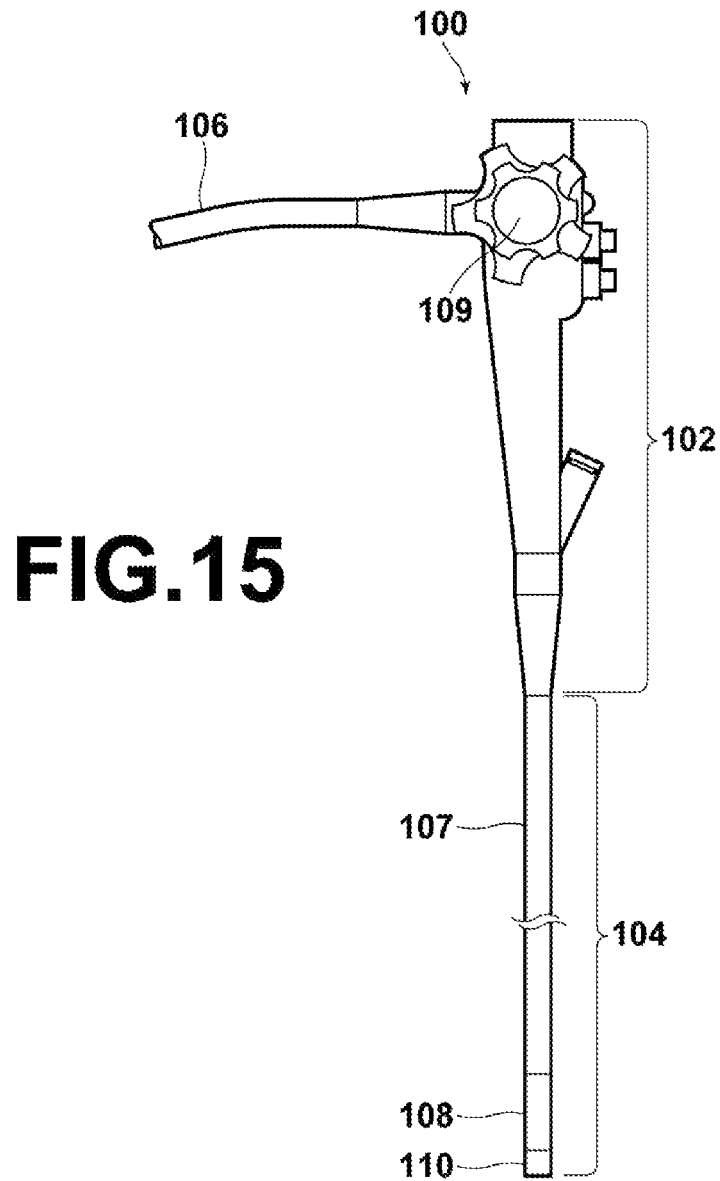
FIG. 15 is a schematic diagram illustrating the structure of an endoscope according to an embodiment of the present invention.

Hereinafter, embodiments of the present invention will be described in detail with reference to drawings. FIG. 1 is a diagram illustrating the structure of an objective lens for an endoscope according to an embodiment of the present invention at a cross section including optical axis Z. The structural example illustrated in FIG. 1 corresponds to a lens structure in Example 1, which will be described later. In FIG. 1, the left side is the object side, and the right side is the image side.

An objective lens for an endoscope according to an embodiment of the present invention is configured to perform focusing from a farthest point object to a nearest point object by moving, along optical axis Z, at least one lens group excluding a most object-side lens group. In FIG. 1, an upper row illustrates a lens structure in a state of having focused on a farthest point object (hereinafter, referred to as a farthest point observation state), a middle row illustrates a lens structure in a state of having focused on a middle point object (hereinafter, referred to as a middle point observation state), and a lower row illustrates a lens structure in a state of having focused on a nearest point object (hereinafter, referred to as a nearest point observation state).

The objective lens for an endoscope of the example illustrated in FIG. 1 substantially consists of first lens group G1 having negative refractive power, second lens group G2 having positive refractive power, third lens group G3 having negative refractive power and fourth lens group G4 having positive refractive power in this order from an object side. The objective lens for an endoscope is configured in such a manner that two lens groups of second lens group G2 and third lens group G3 move, as indicated by arrows between the states in FIG. 1, during focusing from the farthest point observation state to the middle point observation state, and during focusing from the middle point observation state to the nearest point observation state. The directions of the arrows illustrated in FIG. 1 do not indicate exact directions but approximate directions.

As lenses constituting the objective lens for an endoscope illustrated in FIG. 1, first lens group G1 substantially consists of negative lens L1 and a cemented lens of negative lens L2 and positive lens L3 cemented together, in this order from the object side. Second lens group G2 substantially consists of only positive lens L4, which is a single lens. Third lens group G3 substantially consists of a cemented lens of positive lens L5 and negative lens L6 cemented together in this order from the object side. Fourth lens group G4 substantially consists of positive lens L7 and a cemented lens of positive lens L8 and negative lens L9 cemented together, in this order from the object side.

In the example illustrated in FIG. 1, lens L1 and lens L2 are plano-concave lenses with their flat surfaces facing the object side. Lens L3 and lens L4 are biconvex lenses, and lens L5 is a plano-convex lens with its flat surface facing the object side. Lens L6 is a biconcave lens, and lens L7 is a plano-convex lens with its flat surface facing the image side. Lens L8 is a biconvex lens, and lens L9 is a negative meniscus lens with its concave surface facing the object side. Here, the objective lens for an endoscope of the present invention may be structured in such a manner that lens L1 and lens L2 are negative meniscus lenses with their concave surfaces facing the image side, and that lens L5 is a positive meniscus lens with its convex surface facing the image side.

FIG. 1 illustrates an example in which aperture stop St is arranged between second lens group G2 and third lens group G3, and parallel-flat-plate-shaped optical member P1, which is assumed to be a filter or the like, is arranged between lens L1 and lens L2, and optical members P2, P3, which are assumed to be an optical path conversion prism, a filter, a cover glass or the like, are arranged on the image side of fourth lens group G4. However, none of aperture stop St and optical members P1, P2, P3 is an essential structure for the objective lens for an endoscope of the present invention.

In this objective lens for an endoscope, the most object-side lens group is fixed and does not move during focusing. This is because an objective lens for an endoscope is often mounted on an endoscope without using a protective member, and a function of an optical window is also given to the most object-side lens among lenses constituting the objective lens for an endoscope. In that case, for the purpose of maintaining the air-tight condition, it is impossible to structure the objective lens for an endoscope in such a manner that the most object-side lens is movable.

In this objective lens for an endoscope, it is desirable that one of lens groups that move during focusing is a negative lens group. When a negative lens group is moved during focusing, it is possible to easily obtain a larger amount of variation in focal length by a smaller amount of movement. Therefore, that is advantageous to achievement of both reduction in the size of an optical system and a magnified observation effect.

It is desirable that focusing is performed by moving two lens groups in such a manner that a distance between the two lens groups changes. When the number of lens groups that move is two, it is possible to suppress a fluctuation of aberrations caused by the movement of lens groups, and to improve the flexibility in setting a focusing speed with respect to a movement distance of each lens group while simplifying a movement mechanism of lens groups. Further, it is possible to provide the objective lens for an endoscope easily usable by users.

When the number of lens groups that move during focusing is two, it is desirable that the two lens groups is a negative lens group and a positive lens group. In such a case, it is possible to excellently suppress a fluctuation of aberrations caused by the movement of the lens groups, and especially, a fluctuation of chromatic aberrations.

In the objective lens for an endoscope of the present invention, it is desirable that movement paths of lens groups that move during focusing are variable. Specifically, it is desirable that the lens groups that move during focusing have plural kinds of movement paths. When the movement paths of the lens groups that move are variable, it is possible to improve the flexibility in setting a focusing speed with respect to a movement distance of each lens group. Further, it is possible to provide the objective lens for an endoscope easily usable by users.

In the example illustrated in FIG. 1, the entire system substantially consists of four lens groups, and negative refractive power, positive refractive power, negative refractive power and positive refractive power are arranged in this order from the object side. Further, second lens group G2 and third lens group G3 are moved during focusing. Third lens group G3 is moved because of the aforementioned reason. Fourth lens group G4 is not selected as the positive lens group to be moved, but second lens group G2 is selected as the positive lens group to be moved, because second lens group G2, which is easily structurable by using a smaller number of lenses than fourth lens group G4, is desirable to simplify the movement mechanism. However, the objective lens for an endoscope of the present invention is not necessarily limited to the example illustrated in FIG. 1. For example, the lens group that moves during focusing may be only one negative lens group. In such a case, it is possible to simplify a drive mechanism. Further, the number of lens groups constituting the entire system may be three, or five or greater.

The objective lens for an endoscope according to an embodiment of the present invention is configured to satisfy the following conditional formulas (1) and (2):

$$1.2 \leq ft/fw \quad (1); \text{ and}$$

$$0.0 < (fm-fw)/(ft-fw) \leq 0.5 \quad (2), \text{ where}$$

ft: a focal length of an entire system when the objective lens has been focused on the nearest point object, fw: a focal length of the entire system when the objective lens has been focused on the farthest point object, and fm: a focal length of the entire system when the objective lens has been focused on the middle point object.

Object distance dm to the middle point object is represented by the following expression:

$$dm = (2 \times dw \times dt)/(dw+dt), \text{ where}$$

dt: an object distance to the nearest point object,
dw: an object distance to the farthest point object.

In conditional formula (1), ft/fw represents the ratio of magnification (the ratio of enlargement or reduction) induced by a change in the focal length of the entire system. For example, ft/fw corresponds to a zoom ratio of a general zoom lens. When the value of ft/fw in conditional formula (1) is larger than 1, the focal length of the entire system becomes longer during focusing from a farthest point object to a nearest point object. Therefore, it is possible to obtain not only a magnified observation effect achievable by approaching the object but also a magnified observation effect achievable by a change in the focal length of the entire system. When the objective lens for an endoscope is structured in such a manner that the value is not less than the lower limit of conditional formula (1), it is possible to obtain a significant ratio of magnification induced by a change in the focal length of the entire system. When the value is less than the lower limit of conditional formula (1), if a magnification in observation similar to a magnification achievable when conditional formula (1) is satisfied is tried to be achieved, an object distance inevitably becomes short. Consequently, a region insufficiently illuminated with illumination light output from an illumination window arranged at a leading end of an insertion portion of the endoscope is observed. When conditional formula (1) is satisfied, it is possible to obtain a significant ratio of magnification induced by a change in the focal length of the entire system, and perform excellent observation.

Further, dm about conditional formula (2) corresponds to a harmonic mean of dt and dw. A point on the object side of the objective lens for an endoscope at the distance of dm from the objective lens for an endoscope will be referred to as a middle point. Conditional formula (2) is created by taking not only the nearest point and the farthest point but also the middle point into consideration. When the objective lens for an endoscope is structured in such a manner that the value does not exceed the upper limit of conditional formula (2), it is possible to make the focal length in a middle point observation state, which generally tends to be inclined to a long focus side, relatively inclined to a short focus side. Accordingly, it is possible to make the depth of observation during magnified observation at the middle point and in the vicinity thereof deeper. Therefore, adjustment of focus becomes easy. Further, it is possible to suppress a change in the size of an observation image at the middle point and in the vicinity thereof so that the change does not become too large. When the objective lens for an endoscope is structured in such a manner that the value is not less than or equal to the lower limit of conditional formula (2), it is possible to obtain not only a magnified observation effect achievable by approaching the object but also a magnified observation effect achievable by a change in the focal length of the entire system for an object located in the range between the farthest point and the middle point. Therefore, a minute target object becomes observable.

It is desirable that the following conditional formula (2') is satisfied to improve the effect about the upper limit of conditional formula (2) while achieving the effect about the lower limit of conditional formula (2):

$$0.0 < (fm-fw)/(ft-fw) \leq 0.4 \quad (2').$$

In the objective lens for an endoscope according to an embodiment of the present invention, it is desirable that the following conditional formula (3) is satisfied:

$$0.0 < (fmw-fw)/(ft-fw) \leq 0.25 \quad (3), \text{ where}$$

ft: a focal length of an entire system when the objective lens has been focused on the nearest point object, fw: a focal length of the entire system when the objective lens has been focused on the farthest point object, and fmw: a focal length of the entire system when the objective lens has been focused on a medium far point object.

Object distance dmw to the medium far point object is represented by the following expression:

$$dmw = (4 \times dw \times dt)/(dw+3 \times dt), \text{ where}$$

dt: an object distance to the nearest point object,
dw: an object distance to the farthest point object.

Further, dmw about conditional formula (3) corresponds to a harmonic mean of dw and dm. A point on the object side of the objective lens for an endoscope at the distance of dmw from the objective lens for an endoscope will be referred to as a medium far point. Conditional formula (3) is created by taking not only the nearest point and the farthest point but also the medium far point into consideration. When the objective lens for an endoscope is structured in such a manner that the value does not exceed the upper limit of conditional formula (3), it is possible to make the focal length in a medium far point observation state relatively inclined to a short focus side. Accordingly, it is possible to make the depth of observation during magnified observation at the medium far point and in the vicinity thereof deeper. Therefore, adjustment of focus becomes easy. Further, it is possible to suppress a change in the size of an observation image at the medium far point and in the vicinity thereof so that the change does not become too large. When the objective lens for an endoscope is structured in such a manner that the value is not less than or equal to the lower limit of conditional formula (3), it is possible to obtain not only a magnified observation effect achievable by approaching the object but also a magnified observation effect achievable by a change in the focal length of the entire system for an object located in the range between the farthest point and the medium far point. Therefore, a minute target object becomes observable.

It is desirable that the following conditional formula (3') is satisfied to improve the effect about the upper limit of conditional formula (3) while achieving the effect about the lower limit of conditional formula (3):

$$0.0<(fmw-fw)/(ft-fw)\leq 0.20 \quad (3').$$

The aforementioned desirable structures may be adopted in arbitrary combination. It is desirable that the aforementioned structures are optionally adopted in an appropriate manner based on what is requested.

Next, numerical value examples of the objective lens for an endoscope of the present invention will be described.

Example 1

A diagram illustrating the lens structure of the objective lens for an endoscope in Example 1 is illustrated in FIG. 1. The illustration method of FIG. 1 and the structure of the objective lens for an endoscope were described already. Therefore, explanations will not be repeated.

Table 1 shows basic lens data on an objective lens for an endoscope in Example 1. In Table 1, column Si shows the surface number of the i-th surface (i=1, 2, 3, ... ). The object-side surface of a composition element located closest to the object side is the first surface, and surface numbers are assigned to surfaces of composition elements in such a manner to sequentially increase toward the image side. Column Ri shows the curvature radius of the i-th surface, and column Di shows a distance on optical axis Z between the i-th surface and the (i+1)th surface. Column Ndj shows the refractive index of the j-th optical element (j=1, 2, 3, ... ) for d-line (wavelength is 587.6 nm). An optical element closest to the object side is the first element, and numbers are assigned to optical elements in such a manner to sequentially increase toward the image side. Column vdj shows the Abbe number of the j-th optical element for d-line.

The basic lens data including aperture stop St and optical members P1, P2, P3 are shown. In the column of surface numbers, the term of (St) is written for a surface corresponding to aperture stop St together with the surface number. In Table 1, the sign of a curvature radius is positive when a surface shape is convex toward the object side, and negative when a surface shape is convex toward the image side. In the lowest row of the column of Di, a distance between an image-side surface of optical member P3 and an image plane is written. In Table 1, the terms of (VARIABLE 1), (VARIABLE 2), (VARIABLE 3) and (VARIABLE 4) are written for a distance between first lens group G1 and second lens group G2, a distance between second lens group G2 and aperture stop St, a distance between aperture stop St and third lens group G3 and a distance between third lens group G3 and fourth lens group G4, respectively, which are variable surface distances that change during focusing.

Table 2 shows an object distance and the values of (VARIABLE 1), (VARIABLE 2), (VARIABLE 3) and (VARIABLE 4) in each of a farthest point observation state, a medium far point observation state, a middle point observation state, and a nearest point observation state. The focal length of an entire system and values corresponding to conditional formulas (1) through (3) for each state will be collectively shown in Table 8 and Table 9 later together with values for other examples. Values in the following tables are rounded at predetermined digits. In each table, mm is used as the unit of length.

TABLE 1

EXAMPLE 1

| Si | Ri | Di | Ndj | v dj |
|---|---|---|---|---|
| 1 | ∞ | 0.450 | 1.8830 | 40.8 |
| 2 | 1.304 | 0.559 | | |
| 3 | ∞ | 0.300 | 1.7174 | 29.5 |
| 4 | ∞ | 0.524 | | |
| 5 | ∞ | 0.350 | 1.8830 | 40.8 |
| 6 | 1.175 | 1.040 | 1.4388 | 94.9 |
| 7 | −1.742 | (VARIABLE 1) | | |
| 8 | 3.448 | 0.690 | 1.4970 | 81.5 |
| 9 | −1.901 | (VARIABLE 2) | | |
| 10(St) | ∞ | (VARIABLE 3) | | |
| 11 | ∞ | 0.790 | 1.7552 | 27.5 |
| 12 | −0.832 | 0.300 | 1.8830 | 40.8 |
| 13 | 3.342 | (VARIABLE 4) | | |
| 14 | 2.128 | 1.050 | 1.5182 | 58.9 |
| 15 | ∞ | 0.271 | | |
| 16 | 3.647 | 1.370 | 1.4388 | 94.9 |
| 17 | −1.471 | 0.400 | 1.9229 | 18.9 |
| 18 | −3.395 | 1.272 | | |
| 19 | ∞ | 3.200 | 1.5592 | 53.9 |
| 20 | ∞ | 0.300 | 1.5163 | 64.1 |
| 21 | ∞ | 0.050 | | |

TABLE 2

EXAMPLE 1

| | OBSERVATION STATE | | | |
|---|---|---|---|---|
| | FARTHEST POINT | MEDIUM FAR POINT | MIDDLE POINT | NEAREST POINT |
| OBJECT DISTANCE | 13.50 | 5.12 | 3.16 | 1.79 |
| (VARIABLE 1) | 1.197 | 1.172 | 1.108 | 0.515 |
| (VARIABLE 2) | 0.185 | 0.210 | 0.274 | 0.867 |
| (VARIABLE 3) | 0.150 | 0.300 | 0.412 | 0.763 |
| (VARIABLE 4) | 1.073 | 0.924 | 0.811 | 0.460 |

FIG. 4, Sections A, B, C and D are aberration diagrams of the objective lens for an endoscope in Example 1 in a farthest point observation state, and illustrate a spherical aberration, astigmatism, distortion and a lateral chromatic aberration, respectively. Similarly, FIG. 5, Sections A, B, C and D are aberration diagrams of the objective lens for an endoscope in Example 1 in a middle point observation state, and illustrate a spherical aberration, astigmatism, distortion and a lateral chromatic aberration, respectively. FIG. 6, Sections A, B, C and D are aberration diagrams of the objective lens for an endoscope in Example 1 in a nearest point observation state, and illustrate a spherical aberration, astigmatism, distortion and a lateral chromatic aberration, respectively.

In the aberration diagrams of a spherical aberration, astigmatism and distortion, aberrations based d-line, as a reference wavelength, are illustrated. The diagram of the spherical aberration illustrates aberrations also for C-line (wavelength is 656.27 nm) and F-line (wavelength is 486.13 nm). In the diagram of the astigmatism, an aberration for a sagittal direction is indicated by a solid line, and an aberration for a tangential direction is indicated by a broken line. The diagram of the lateral chromatic aberration illustrates aberrations for C-line and F-line. In the diagram of the spherical aberration, FNo. represents F-number, and in the other diagrams, ω represents a half angle of view.

The illustration method and the signs, meanings and description methods of various data about Example 1, as described above, are similar in the following examples, unless otherwise mentioned. Therefore, explanations will not be repeated.

Example 2-1

FIG. 2 is a diagram illustrating the lens structure of an objective lens for an endoscope in Example 2-1 in a farthest point observation state, a middle point observation state, and a nearest point observation state. The basic lens data on the objective lens for an endoscope in Example 2-1 are the same as the basic lens data on the objective lens for an endoscope in Example 1. Therefore, descriptions on the basic lens data will be omitted. In the objective lens for an endoscope in Example 2-1, an object distance in a farthest point observation state is the same as an object distance in a farthest point observation state in Example 1. However, object distances in the other observation states in Example 2-1 differ from those in Example 1. Table 3 shows an object distance and the values of (VARIABLE 1), (VARIABLE 2), (VARIABLE 3) and (VARIABLE 4) in each of a farthest point observation state, a medium far point observation state, a middle point observation state, and a nearest point observation state of the objective lens for an endoscope in Example 2-1.

TABLE 3

EXAMPLE 2-1

| | OBSERVATION STATE | | | |
|---|---|---|---|---|
| | FARTHEST POINT | MEDIUM FAR POINT | MIDDLE POINT | NEAREST POINT |
| OBJECT DISTANCE | 13.50 | 5.24 | 3.25 | 1.85 |
| (VARIABLE 1) | 1.197 | 0.987 | 0.868 | 0.286 |
| (VARIABLE 2) | 0.185 | 0.395 | 0.514 | 1.095 |
| (VARIABLE 3) | 0.150 | 0.232 | 0.365 | 0.942 |
| (VARIABLE 4) | 1.073 | 0.991 | 0.859 | 0.281 |

FIG. 7, Sections A, B, C and D are aberration diagrams of the objective lens for an endoscope in Example 2-1 in a farthest point observation state, and illustrate a spherical aberration, astigmatism, distortion and a lateral chromatic aberration, respectively. FIG. 8, Sections A, B, C and D are aberration diagrams of the objective lens for an endoscope in Example 2-1 in a middle point observation state, and illustrate a spherical aberration, astigmatism, distortion and a lateral chromatic aberration, respectively. FIG. 9, Sections A, B, C and D are aberration diagrams of the objective lens for an endoscope in Example 2-1 in a nearest point observation state, and illustrate a spherical aberration, astigmatism, distortion and a lateral chromatic aberration, respectively.

Example 2-2

The basic lens data on the objective lens for an endoscope in Example 2-2 are the same as the basic lens data on the objective lens for an endoscope in Example 1 and Example 2-1. Further, an object distance in a farthest point observation state and an object distance in a nearest point observation state of the objective lens for an endoscope in Example 2-2 are the same as the object distances in Example 2-1. In Example 2-1 and Example 2-2, the basic lens data, the farthest point object distance and the nearest point object distance are the same, but the paths of movement are variable. Table 4 shows an object distance and the values of (VARIABLE 1), (VARIABLE 2), (VARIABLE 3) and (VARIABLE 4) in each of a farthest point observation state, a medium far point observation state, a middle point observation state, and a nearest point observation state of the objective lens for an endoscope in Example 2-2.

TABLE 4

EXAMPLE 2-2

| | OBSERVATION STATE | | | |
|---|---|---|---|---|
| | FARTHEST POINT | MEDIUM FAR POINT | MIDDLE POINT | NEAREST POINT |
| OBJECT DISTANCE | 13.50 | 5.24 | 3.25 | 1.85 |
| (VARIABLE 1) | 1.197 | 1.107 | 0.804 | 0.286 |
| (VARIABLE 2) | 0.185 | 0.275 | 0.578 | 1.095 |
| (VARIABLE 3) | 0.150 | 0.270 | 0.362 | 0.942 |
| (VARIABLE 4) | 1.073 | 0.953 | 0.861 | 0.281 |

A spherical aberration, astigmatism, distortion and a lateral chromatic aberration of the objective lens for an endoscope in Example 2-2 in a farthest point observation state are illustrated in the aberration diagrams of FIG. 7, Sections A, B, C and D, respectively. A spherical aberration, astigmatism, distortion and a lateral chromatic aberration of the objective lens for an endoscope in Example 2-2 in a nearest point observation state are illustrated in the aberration diagrams of FIG. 9, Sections A, B, C and D, respectively. FIG. 10, Sections A, B, C and D are aberration diagrams of the objective lens for an endoscope in Example 2-2 in a middle point observation state, and illustrate a spherical aberration, astigmatism, distortion and a lateral chromatic aberration, respectively.

Example 3-1

FIG. 3 is a diagram illustrating the lens structure of an objective lens for an endoscope in Example 3-1 in a farthest point observation state, a middle point observation state, and a nearest point observation state. Table 5 shows basic lens data on the objective lens for an endoscope in Example 3-1. Table 6 shows an object distance and the values of (VARIABLE 1), (VARIABLE 2), (VARIABLE 3) and (VARIABLE 4) in each of a farthest point observation state, a medium far point observation state, a middle point observation state, and a nearest point observation state of the objective lens for an endoscope in Example 3-1.

TABLE 5

EXAMPLE 3-1

| Si | Ri | Di | Ndj | ν dj |
|---|---|---|---|---|
| 1 | 12.000 | 0.450 | 2.0010 | 29.1 |
| 2 | 1.071 | 0.619 | | |
| 3 | ∞ | 0.300 | 1.7847 | 25.7 |
| 4 | ∞ | 0.151 | | |
| 5 | 22.996 | 0.350 | 1.9538 | 32.3 |
| 6 | 1.289 | 1.271 | 1.4388 | 94.9 |
| 7 | −1.673 | (VARIABLE 1) | | |
| 8 | 3.512 | 0.734 | 1.4875 | 70.2 |
| 9 | −2.037 | (VARIABLE 2) | | |
| 10(St) | ∞ | (VARIABLE 3) | | |
| 11 | −5.774 | 0.821 | 1.9229 | 20.9 |
| 12 | −0.751 | 0.300 | 2.0010 | 29.1 |
| 13 | 15.912 | (VARIABLE 4) | | |
| 14 | 1.860 | 1.021 | 1.4388 | 94.9 |

TABLE 5-continued

EXAMPLE 3-1

| Si | Ri | Di | Ndj | v dj |
|---|---|---|---|---|
| 15 | ∞ | 0.150 | | |
| 16 | 4.995 | 1.575 | 1.4388 | 94.9 |
| 17 | −1.309 | 0.400 | 1.9229 | 18.9 |
| 18 | −3.223 | 1.220 | | |
| 19 | ∞ | 3.200 | 1.5592 | 53.9 |
| 20 | ∞ | 0.300 | 1.5163 | 64.1 |
| 21 | ∞ | 0.050 | | |

TABLE 6

EXAMPLE 3-1

OBSERVATION STATE

| | FARTHEST POINT | MEDIUM FAR POINT | MIDDLE POINT | NEAREST POINT |
|---|---|---|---|---|
| OBJECT DISTANCE | 12.00 | 4.36 | 2.67 | 1.50 |
| (VARIABLE 1) | 1.269 | 1.082 | 0.823 | 0.147 |
| (VARIABLE 2) | 0.185 | 0.372 | 0.631 | 1.307 |
| (VARIABLE 3) | 0.150 | 0.268 | 0.420 | 1.308 |
| (VARIABLE 4) | 1.812 | 1.694 | 1.542 | 0.654 |

FIG. 11, Sections A, B, C and D are aberration diagrams of the objective lens for an endoscope in Example 3-1, and illustrate a spherical aberration, astigmatism, distortion and a lateral chromatic aberration in a farthest point observation state, respectively. FIG. 12, Sections A, B, C and D are aberration diagrams of the objective lens for an endoscope in Example 3-1 in a middle point observation state, and illustrate a spherical aberration, astigmatism, distortion and a lateral chromatic aberration, respectively. FIG. 13, Sections A, B, C and D are aberration diagrams of the objective lens for an endoscope in Example 3-1 in a nearest point observation state, and illustrate a spherical aberration, astigmatism, distortion and a lateral chromatic aberration, respectively.

Example 3-2

The basic lens data and the object distance in a farthest point observation state and the object distance in the nearest point observation state in Example 3-2 are the same as those in Example 3-1. In Example 3-1 and Example 3-2, the basic lens data, the object distance in a farthest point observation state and the object distance in a nearest point observation state are the same, but the paths of movement are variable. Table 7 shows an object distance and the values of (VARIABLE 1), (VARIABLE 2), (VARIABLE 3) and (VARIABLE 4) in each of a farthest point observation state, a medium far point observation state, a middle point observation state, and a nearest point observation state of the objective lens for an endoscope in Example 3-2.

TABLE 7

EXAMPLE 3-2

OBSERVATION STATE

| | FARTHEST POINT | MEDIUM FAR POINT | MIDDLE POINT | NEAREST POINT |
|---|---|---|---|---|
| OBJECT DISTANCE | 12.00 | 4.36 | 2.67 | 1.50 |
| (VARIABLE 1) | 1.269 | 0.964 | 0.962 | 0.147 |
| (VARIABLE 2) | 0.185 | 0.491 | 0.492 | 1.307 |
| (VARIABLE 3) | 0.150 | 0.245 | 0.419 | 1.308 |
| (VARIABLE 4) | 1.812 | 1.717 | 1.544 | 0.654 |

A spherical aberration, astigmatism, distortion and a lateral chromatic aberration of the objective lens for an endoscope in Example 3-2 in a farthest point observation state are illustrated in the aberration diagrams of FIG. 11, Sections A, B, C and D, respectively. A spherical aberration, astigmatism, distortion and a lateral chromatic aberration of the objective lens for an endoscope in Example 3-2 in a nearest point observation state are illustrated in the aberration diagrams in FIG. 13, Sections A, B, C and D, respectively. FIG. 14, Sections A, B, C and D are aberration diagrams of the objective lens for an endoscope in Example 3-2 in a middle point observation state, and illustrate a spherical aberration, astigmatism, distortion and a lateral chromatic aberration, respectively.

Table 8 collectively shows an object distance, a focal length and a focal length ratio in each of a farthest point observation state, a medium far point observation state, a middle point observation state, a medium near point observation state and a nearest point observation state of objective lenses for endoscopes in Examples 1, 2-1, 2-2, 3-1 and 3-2. Here, the term "medium near point observation state" refers to a state in which the objective lens has been focused on a medium near object, and object distance dmt to the medium near object is represented by the following expression:

$$dmt=(4 \times dw \times dt)/(3 \times dw + dt), \text{ where}$$

dt: an object distance to the nearest point object, dw: an object distance to the farthest point object.

The term "focal length ratio" in Table 8 is a value represented by $(fx-fw)/(ft-fw)$ when a focal length of an entire system at a certain state is $fx$. A focal length ratio in a medium far point observation state is represented by $(fmw-fw)/(ft-fw)$. A focal length ratio in a middle point observation state is represented by $(fm-fw)/(ft-fw)$.

TABLE 8

| | OBSERVATION STATE | OBJECT DISTANCE | FOCAL LENGTH | FOCAL LENGTH RATIO |
|---|---|---|---|---|
| EXAMPLE 1 | FARTHEST POINT | 13.50 | 1.46 | 0.00 |
| | MEDIUM FAR POINT | 5.12 | 1.52 | 0.11 |
| | MIDDLE POINT | 3.16 | 1.59 | 0.24 |

TABLE 8-continued

|  | OBSERVATION STATE | OBJECT DISTANCE | FOCAL LENGTH | FOCAL LENGTH RATIO |
|---|---|---|---|---|
|  | MEDIUM NEAR POINT | 2.29 | 1.77 | 0.57 |
|  | NEAREST POINT | 1.79 | 2.00 | 1.00 |
| EXAMPLE 2-1 | FARTHEST POINT | 13.50 | 1.46 | 0.00 |
|  | MEDIUM FAR POINT | 5.24 | 1.59 | 0.18 |
|  | MIDDLE POINT | 3.25 | 1.70 | 0.33 |
|  | MEDIUM NEAR POINT | 2.36 | 1.90 | 0.61 |
|  | NEAREST POINT | 1.85 | 2.18 | 1.00 |
| EXAMPLE 2-2 | FARTHEST POINT | 13.50 | 1.46 | 0.00 |
|  | MEDIUM FAR POINT | 5.24 | 1.54 | 0.11 |
|  | MIDDLE POINT | 3.25 | 1.74 | 0.39 |
|  | MEDIUM NEAR POINT | 2.36 | 1.90 | 0.61 |
|  | NEAREST POINT | 1.85 | 2.18 | 1.00 |
| EXAMPLE 3-1 | FARTHEST POINT | 12.00 | 1.26 | 0.00 |
|  | MEDIUM FAR POINT | 4.36 | 1.38 | 0.14 |
|  | MIDDLE POINT | 2.67 | 1.55 | 0.33 |
|  | MEDIUM NEAR POINT | 1.92 | 1.95 | 0.79 |
|  | NEAREST POINT | 1.50 | 2.13 | 1.00 |
| EXAMPLE 3-2 | FARTHEST POINT | 12.00 | 1.26 | 0.00 |
|  | MEDIUM FAR POINT | 4.36 | 1.43 | 0.20 |
|  | MIDDLE POINT | 2.67 | 1.48 | 0.25 |
|  | MEDIUM NEAR POINT | 1.92 | 1.95 | 0.79 |
|  | NEAREST POINT | 1.50 | 2.13 | 1.00 |

Table 9 shows values corresponding to conditional formulas (1) through (3) for the objective lenses for endoscopes in Examples 1, 2-1, 2-2, 3-1 and 3-2. As Table 9 shows, all of the examples satisfy conditional formulas (1) through (3). Table 9 show values when d-line is a reference wavelength.

TABLE 9

|  | CONDITIONAL FORMULA (1) $ft/fw$ | CONDITIONAL FORMULA (2) $(fm - fw)/(ft - fw)$ | CONDITIONAL FORMULA (3) $(fmw - fw)/(ft - fw)$ |
|---|---|---|---|
| EXAMPLE 1 | 1.37 | 0.24 | 0.11 |
| EXAMPLE 2-1 | 1.49 | 0.33 | 0.18 |
| EXAMPLE 2-2 | 1.49 | 0.39 | 0.11 |
| EXAMPLE 3-1 | 1.69 | 0.33 | 0.14 |
| EXAMPLE 3-2 | 1.69 | 0.25 | 0.20 |

Next, with reference to Table 10, comparative examples will be described. Comparative Examples 1 through 6 in Table 10 correspond to Examples 1 through 6 of the objective lens for an endoscope disclosed in the aforementioned Patent Document 1 (Japanese Patent No. 2876252), respectively. Table 10 shows an object distance, a focal length and a value corresponding to conditional formula (2) in each of a farthest point observation state, a middle point observation state, a nearest point observation state of these Comparative Examples 1 through 6. Here, the object distance in the nearest point observation state in Comparative Example 2 is not an object distance copied from Patent Document 1. The object distance was calculated by using lens data described in Patent Document 1 under the assumption that a back focus in a wide state and a back focus in a tele state are the same. As Table 10 shows, none of Comparative Examples 1 through 6 satisfies Conditional formula (2).

TABLE 10

|  | OBSERVATION STATE | OBJECT DISTANCE | FOCAL LENGTH | CONDITIONAL FORMULA (2) $(fm - fw)/(ft - fw)$ |
|---|---|---|---|---|
| COMPARATIVE EXAMPLE 1 | FARTHEST POINT | 9.4162 | 1.188 | 0.650 |
|  | MIDDLE POINT | 6.277 | 1.535 |  |
|  | NEAREST POINT | 4.7081 | 1.722 |  |
| COMPARATIVE EXAMPLE 2 | FARTHEST POINT | 9.0909 | 1.234 | 0.634 |
|  | MIDDLE POINT | 5.884 | 1.554 |  |
|  | NEAREST POINT | 4.35 | 1.739 |  |
| COMPARATIVE EXAMPLE 3 | FARTHEST POINT | 8.4416 | 1.259 | 0.548 |
|  | MIDDLE POINT | 5.628 | 1.44 |  |
|  | NEAREST POINT | 4.2208 | 1.589 |  |
| COMPARATIVE EXAMPLE 4 | FARTHEST POINT | 8.4416 | 1.249 | 0.636 |
|  | MIDDLE POINT | 5.628 | 1.462 |  |
|  | NEAREST POINT | 4.2208 | 1.584 |  |
| COMPARATIVE EXAMPLE 5 | FARTHEST POINT | 8.4416 | 1.16 | 0.658 |
|  | MIDDLE POINT | 5.628 | 1.502 |  |
|  | NEAREST POINT | 4.2208 | 1.68 |  |
| COMPARATIVE EXAMPLE 6 | FARTHEST POINT | 8.4415 | 1.277 | 0.621 |
|  | MIDDLE POINT | 5.628 | 1.485 |  |
|  | NEAREST POINT | 4.2208 | 1.612 |  |

Next, with reference to FIG. 15 through FIG. 17, embodiments of an endoscope to which the objective lens for an endoscope of the present invention is applied will be described. FIG. 15 is a schematic diagram illustrating the configuration of the whole endoscope. An endoscope 100 illustrated in FIG. 15 mainly includes an operation unit 102, an insertion unit 104 and a connector unit (not illustrated) for connecting a universal cord 106. An insertion unit 104, which is inserted into a patient's body, is connected to a leading end side of the operation unit 102, and the universal cord 106 for connecting to the connector unit for connecting to a light source apparatus or the like extends from the base end side of the operation unit 102.

A most part of the insertion unit 104 is a flexible portion 107, which is bendable in an arbitrary direction along an insertion path. Further, a curving portion 108 is connected to the leading end of this flexible portion 107, and a leading end portion 110 is sequentially connected to the leading end of this curved portion 108. The curving portion 108 is provided to direct the leading end portion 110 to a desirable direction, and a curving operation is performable by rotating a curve operation knob 109 provided at the operation unit 102.

Figure 16:
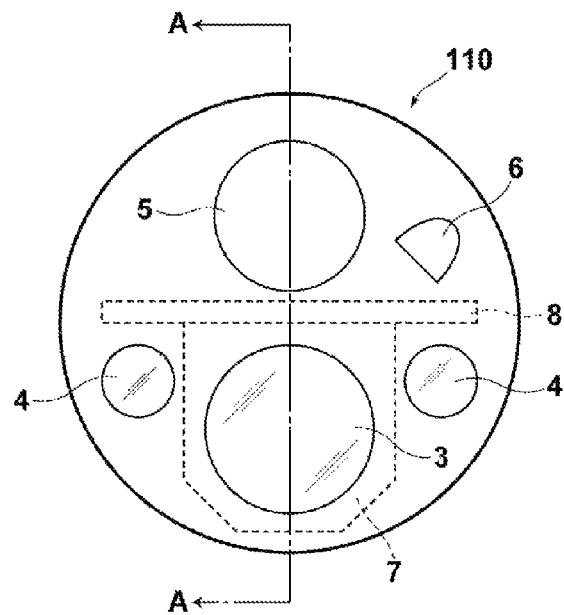
FIG. 16 is a plan view illustrating a leading end surface of an insertion unit of the endoscope according to the embodiment of the present invention.

FIG. 16 is a plan view illustrating the leading end of the leading end portion 110 at a plane perpendicular to the direction of a longitudinal axis of the insertion unit 104. FIG. 17 is a cross section of a major part of the leading end portion 110 at line A-A. As illustrated in FIG. 16, an observation window 3, which is an outer surface of the objective lens 2 for an endoscope, two illumination windows 4, which are provided on both sides of the observation window 3 to output illumination light from a light guide, a treatment tool insertion opening 5 and an air supply/water supply nozzle 6 are provided on the leading end surface of the leading end portion 110.

Figure 17:
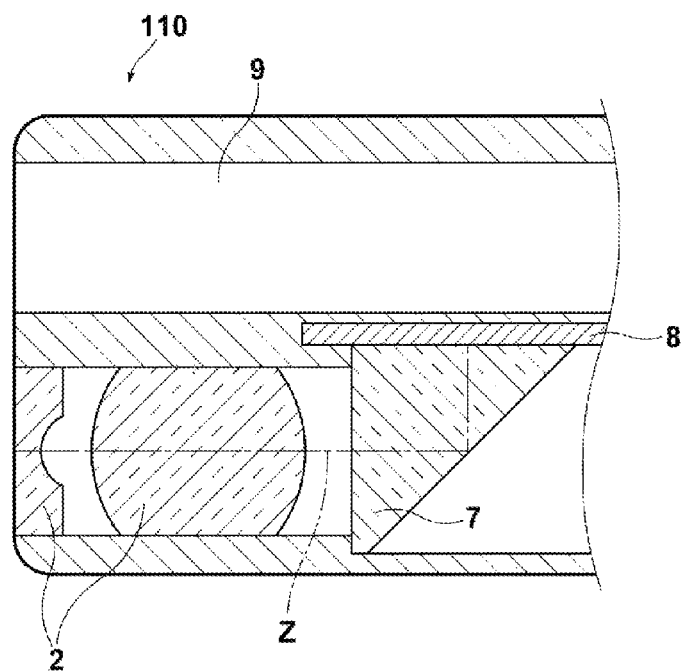
FIG. 17 is a cross section illustrating a major part of a leading end hard portion of the endoscope.

Further, as illustrated in FIG. 17, the objective lens 2 for an endoscope, an optical path conversion prism 7 and a solid-state imaging device 8 are arranged in the leading end portion 110. The objective lens 2 for an endoscope is arranged in such a manner that the optical axis of the objective lens 2 for an endoscope is parallel to the direction of the longitudinal axis of the insertion unit 104. The optical path conversion prism 7 is provided to bend the image-side optical path of the objective lens 2 for an endoscope by about 90 degrees. The solid-state imaging device 8 is cemented on the optical path conversion prism 7 in such a manner that a light receiving surface of the solid-state imaging device 8 is parallel to the direction of a longitudinal axis of the insertion unit 104.

In FIG. 17, the objective lens 2 for an endoscope is conceptually illustrated. The solid-state imaging device 8 is arranged in such a manner that the imaging surface of the solid-state imaging device 8 matches with the image plane of the objective lens 2 for an endoscope. The solid-state imaging device 8 images an optical image formed by the objective lens 2 for an endoscope, and outputs electrical signals. The solid-state imaging device 8 includes a cover glass for protecting a light receiving surface. However, in FIG. 16 and FIG. 17, the cover glass is included in the solid-state imaging device 8, and illustrated as the solid-state imaging device 8. In FIG. 17, optical axis Z of an observation optical system by the objective lens 2 for an endoscope is indicated by a dot dashed line. The structure in which the optical path is bent, as illustrated in FIG. 17, is adopted. Therefore, as illustrated in FIG. 16, a straight-view-type observation optical system is configured in the lower half of the leading end portion 110, and a treatment tool insertion channel 9 is configured in the upper half of the leading end portion 110. It is possible to arrange many elements in the insertion unit with a small diameter.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

For example, all of the objective lenses for endoscopes in the aforementioned examples consist of refractive lenses using no aspherical surface. However, the objective lens for an endoscope of the present invention is not limited to this. The objective lens for an endoscope of the present invention may be structured to correct chromatic aberrations and various aberrations by using one of an aspherical surface, a GRIN (Gradient Index) lens (a refractive index distribution lens) and a diffraction optical element, or an arbitrary combination themof.

What is claimed is:

1. An objective lens for an endoscope, wherein the objective lens focuses from a farthest point object to a nearest point object by moving, along an optical axis, at least one lens group excluding a most object-side lens group, and
wherein the following conditional formulas (1) and (2') are satisfied:

$$1.2 \leq ft/fw \qquad (1); \text{ and,}$$

$$0.0 < (fm-fw)/(ft-fw) \leq 0.4 \qquad (2'),$$

where
ft: a focal length of an entire system when the objective lens has been focused on the nearest point object, where an object distance to the nearest point object is dt,
fw: a focal length of the entire system when the objective lens has been focused on the farthest point object, where an object distance to the farthest point object is dw, and
fm: a focal length of the entire system when the objective lens has been focused on a middle point object, where an object distance to the middle point object is dm, which is represented by $dm=(2 \times dw \times dt)/(dw+dt)$.

2. The objective lens for an endoscope, as defined in claim 1, wherein the focusing is performed by moving two lens groups in such a manner that a distance between the two lens groups changes.

3. The objective lens for an endoscope, as defined in claim 2, wherein one of the lens groups that move during focusing is a negative lens group.

4. The objective lens for an endoscope, as defined in claim 2, wherein the two lens groups that move during focusing are a positive lens group and a negative lens group.

5. The objective lens for an endoscope, as defined in claim 4, wherein the following conditional formula (3) is satisfied:

$$0.0 < (fmw-fw)/(ft-fw) \leq 0.25 \qquad (3), \text{ where}$$

fmw: a focal length of the entire system when the objective lens has been focused on a medium far point object, where an object distance to the medium far point object is dmw, which is represented by $dmw=(4 \times dw \times dt)/(dw+3 \times dt)$.

6. The objective lens for an endoscope, as defined in claim 4, substantially consisting of:
a first lens group having negative refractive power;
a second lens group having positive refractive power;
a third lens group having negative refractive power; and a fourth lens group having positive refractive power in this order from an object side.

7. The objective lens for an endoscope, as defined in claim 4, wherein a movement path of the at least one lens group that moves during focusing is variable.

8. The objective lens for an endoscope, as defined in claim 4, wherein the following conditional formula (3') is satisfied:

$$0.0 < (fmw - fw)/(ft - fw) \leq 0.20 \quad (3'), \text{where}$$

fmw: a focal length of the entire system when the objective lens has been focused on a medium far point object, where an object distance to the medium far point object is dmw, which is represented by dmw=(4×dw×dt)/(dw+3×dt).

9. The objective lens for an endoscope, as defined in claim 1, wherein the following conditional formula (3) is satisfied:

$$0.0 < (fmw - fw)/(ft - fw) \leq 0.25 \quad (3), \text{where}$$

fmw: a focal length of the entire system when the objective lens has been focused on a medium far point object, where an object distance to the medium far point object is dmw, which is represented by dmw=(4×dw×dt)/(dw+3×dt).

10. The objective lens for an endoscope, as defined in claim 1, substantially consisting of:
    a first lens group having negative refractive power;
    a second lens group having positive refractive power;
    a third lens group having negative refractive power; and
    a fourth lens group having positive refractive power in this order from an object side.

11. The objective lens for an endoscope, as defined in claim 1, wherein a movement path of the at least one lens group that moves during focusing is variable.

12. The objective lens for an endoscope, as defined in claim 1, wherein the following conditional formula (3') is satisfied:

$$0.0 < (fmw - fw)/(ft - fw) \leq 0.20 \quad (3'), \text{where}$$

fmw: a focal length of the entire system when the objective lens has been focused on a medium far point object, where an object distance to the medium far point object is dmw, which is represented by dmw=(4×dw×dt)/(dw+3×dt).

13. An endoscope comprising:
the objective lens for an endoscope, as defined in claim 1.

* * * * *